Patented Nov. 12, 1929

1,735,433

UNITED STATES PATENT OFFICE

FRIEDRICH AUGUST HENGLEIN, OF COLOGNE-DEUTZ, AND FRANZ SCHLEICHER, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE MANUFACTURE AND PRODUCTION OF ACETIC ACID ANHYDRIDE FROM ACETIC ACID

No Drawing. Application filed September 12, 1927, Serial No. 219,170, and in Germany September 22, 1926.

The present invention concerns the dissociation of acetic acid into water and acetic anhydride and the separation of the vapors thus produced.

It is known that acetic acid can be dissociated in the presence of catalists at temperatures exceeding 500° C. into water vapor and acetic anhydride vapor; difficulties are however encountered in attempting the separation of the resulting products of the reaction.

According to the present invention said vapors containing water vapor and acetic acid or acetic anhydride are separated by diffusion through materials e. g. porous plates or cylinders, since the light molecules of the water diffuse more rapidly through the same than the heavy acetic anhydride molecules.

In this way a concentration of acetic anhydride is obtained, which can be considerably increased by repeated diffusion, so that the new process can be employed technically with considerable advantage.

We claim:

In the process for the manufacture of acetic anhydride from acetic acid the step comprising dissociating the acetic acid into water vapor and acetic anhydride vapor and separating the vapors thus obtained by diffusion through porous materials.

In testimony whereof we have hereunto set our hands.

FRIEDRICH AUGUST HENGLEIN.
FRANZ SCHLEICHER.